Jan. 29, 1963 J. W. CRETZMEYER 3,075,827
PROCESS FOR PRODUCING ANHYDROUS LITHIUM PERCHLORATE
Filed Sept. 8, 1959
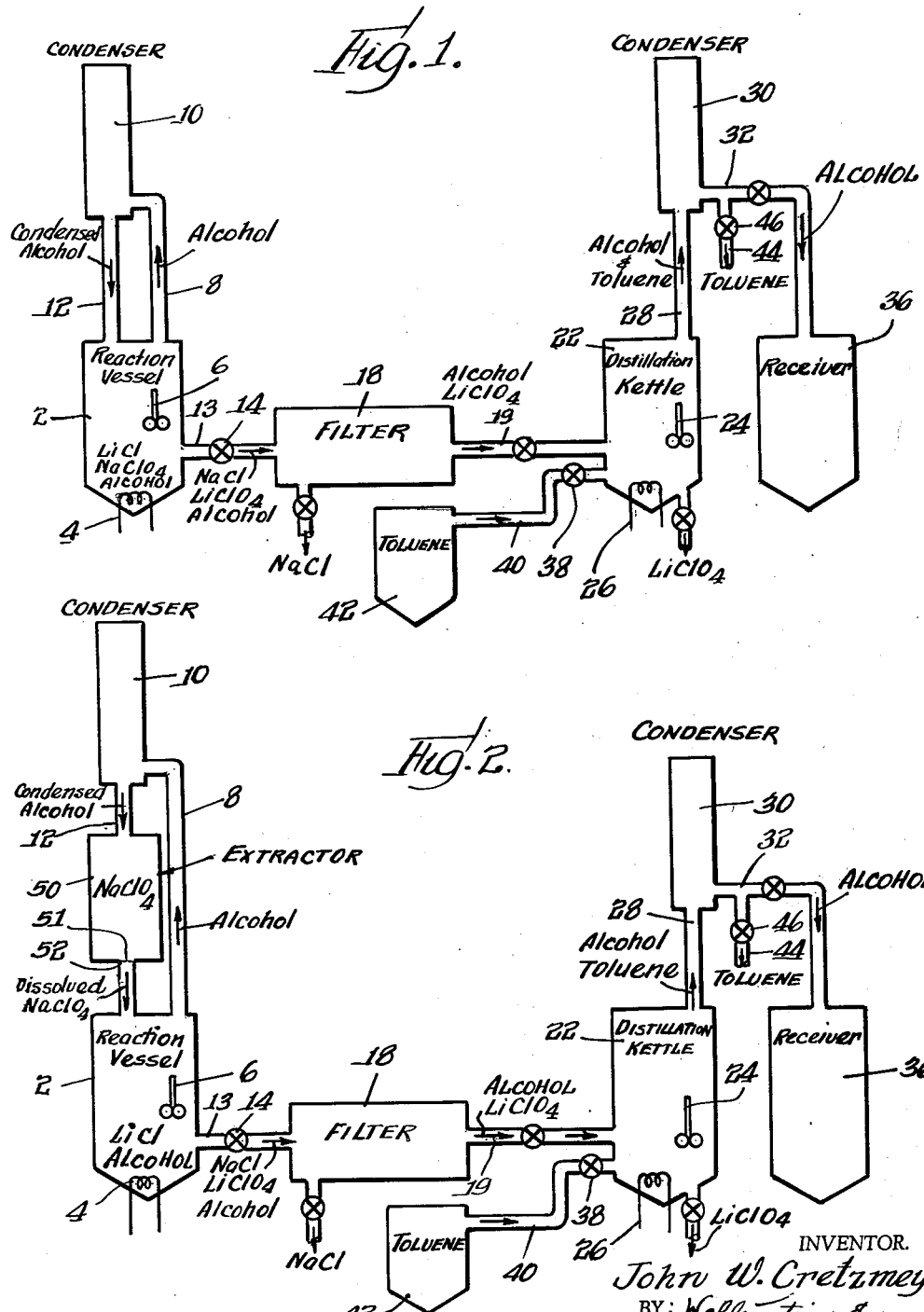
INVENTOR.
John W. Cretzmeyer
BY: Wallenstein &
Spangenberg
Attys.

United States Patent Office 3,075,827
Patented Jan. 29, 1963

3,075,827
PROCESS FOR PRODUCING ANHYDROUS
LITHIUM PERCHLORATE
John W. Cretzmeyer, Minneapolis, Minn., assignor to Lithium Corporation of America, Inc., Minneapolis, Minn., a corporation of Minnesota
Filed Sept. 8, 1959, Ser. No. 838,695
8 Claims. (Cl. 23—85)

This invention relates to a process and apparatus for producing anhydrous lithium perchlorate. The production of anhydrous lithium perchlorate by processes heretofore known involves the production of lithium perchlorate containing water of hydration followed by a dehydration procedure at elevated temperatures. The dehydration procedure is slow and, therefore, costly. It is, accordingly, an object of the present invention to provide a process and apparatus for producing anhydrous lithium perchlorate which avoids the disadvantages of these processes, particularly the costly dehydration of hydrated lithium perchlorate at elevated temperatures.

The process in its broader aspects involves reacting together an anhydrous salt of perchloric acid other than lithium perchlorate with an anhydrous lithium salt which reacts by double decomposition with said anhydrous salt of perchloric acid, said reaction being carried out in an organic non-aqueous solvent in which lithium perchlorate, said anhydrous salt of perchloric acid and said anhydrous lithium salt are soluble, but in which the salt other than lithium perchlorate resulting from the reaction is insoluble. The thus produced anhydrous lithium perchlorate is readily recovered from the organic solvent, for instance, by filtering out the insoluble salt and distilling off the solvent from the filtrate.

The process works most effectively when the starting materials are anhydrous sodium perchlorate and anhydrous lithium chloride, dissolved in a low molecular weight alcohol, such as methanol, ethanol, propanol or butanol, preferably a propyl alcohol such as n-propanol or isopropyl alcohol. Although less preferred, instead of sodium perchlorate, ammonium, magnesium, strontium or barium perchlorate can be used; and, instead of lithium chloride, lithium bromide, lithium nitrate, lithium nitrite or lithium chromate can be used. Although low molecular weight alcohols are decidedly the preferred solvents, other organic solvents satisfying the foregoing requirements can be utilized, particularly acetone which produces very satisfactory results when barium or strontium perchlorate is used as a starting material.

Another aspect of the present invention resides in the apparatus for carrying out the basic process of the invention briefly described above. Examples of this apparatus are described in the specification to follow and illustrated in the drawings wherein:

FIG. 1 is a diagrammatic illustration of apparatus suitable for carrying out the process of the present invention; and FIG. 2 is a diagrammatic illustration of other apparatus for carrying out the process of the present invention.

Referring to FIG. 1, the starting ingredients are initially charged into a reaction vessel 2. As above indicated, the starting ingredients are (a) an anhydrous salt of perchloric acid other than lithium perchlorate, most desirably sodium perchlorate, (b) an anhydrous lithium salt, such as lithium chloride, and (c) a substantially non-aqueous or anhydrous organic solvent, preferably a low molecular weight alcohol, in which the above mentioned salts are dissolved. The spaces within reaction vessel 2 and the other conduits and vessels to be described are kept essentially free of moisture in any suitable way, such as by mechanically sealing the spaces from the surrounding atmosphere or by filling these spaces with inert gases. The reaction vessel 2 preferably includes suitable heating means 4 and agitating means 6 for respectively heating and agitating the contents of the vessel. If the temperature to which the starting materials are heated to dissolve the salts and to effect the efficient reaction thereof is above the boiling point of the organic solvent, then an excess of solvent is used and the evaporated solvent is fed to a condenser where it is condensed and returned to the reaction vessel. To this end, an outlet conduit 8 extends from the top of the reaction vessel 2 to a suitable condenser 10 which condenses the evaporated organic solvent and returns the condensed solvent through a return conduit 12 to the reaction vessel.

As previously indicated, the chemical reaction between the dissolved anhydrous starting materials produces the desired lithium perchlorate dissolved in the organic solvent and a precipitate of the other reaction product which would be sodium chloride if sodium perchlorate and lithium chloride were the starting materials. A discharge conduit 13 having an initially closed valve 14 extends from the bottom portion of the reaction vessel 2 to a suitable filter 18. When the reaction between the starting materials in the reaction vessel 2 is complete, the valve 14 is opened to allow the contents of the reaction vessel to pass through filter 18, which removes the insoluble reaction product. The filtrate passes through a conduit 19 into a distillation kettle 22, and the filtered precipitate is recovered from the filter. The distillation kettle 22 includes suitable agitating means 24 for agitating contents thereof and heating means 26 which effects the distillation of the organic solvent. The distillation of the organic solvent may be aided, if desired, by application of vacuum to the kettle. The distilled solvent passes through a conduit 28 at the top of the distillation kettle to a suitable condenser 30 where the solvent is condensed and passed through a conduit 32 to a suitable receiver or storage tank 36. Anhydrous lithium perchlorate crystals form in the bottom of the distillation kettle.

When the organic solvent is substantially completely evaporated, the heat (and vacuum is used) are cut off and an on-off valve 38 in a conduit 40 extending between a toluene supply tank 42 and the distillation kettle is opened to feed toluene to the distillation kettle. Sufficient toluene is added to just cover the lithium perchlorate crystals in the distillation kettle. Next, the distillation kettle is sealed by closure of the various valves in the conduits leading thereto, and heat and vacuum are applied to distill the toluene. As the toluene distills, it carries with it as an azeotrope any solvent or moisture which may still be in the distillation kettle. The distilled toluene passes through the conduit 28 into the condenser 30, and the condensed toluene may then be carried to a suitable location through a discharge conduit 44 having an on-off control valve 46. After the toluene has been completely distilled, the contents of the distillation kettle are preferably heated and agitated for several hours or more to free the lithium perchlorate of any volatile materials.

Reference is now made to FIG. 2 which shows a preferred form of apparatus for producing lithium perchlorate. That part of the system illustrated following the reaction vessel 2 is identical with the corresponding portion of the system shown in FIG. 1, and thus will not again be described, and all common elements used in the two systems are similarly numbered.

The apparatus illustrated in FIG. 2 differs from that shown in FIG. 1 in the addition of an extractor 50 between the condenser 10 and the reaction vessel 2. In the preferred process, only the lithium salt starting material, such as lithium chloride, and the organic solvent are initially placed in the reaction vessel 2. The perchlorate salt starting material, such as sodium perchlorate, is placed in its crystalline form in the extractor 50. The extractor has a discharge opening 51 in the bottom thereof which communicates with the top of the reaction vessel and this opening is covered by a porous disk 52 made, for example, of sintered glass which prevents the passage of the perchlorate salt crystals to the extractor 50. The perchlorate salt crystals in the extractor 50 are thus gradually dissolved in the liquid organic solvent being returned from the condenser 10 to the reaction vessel 2. This process of feeding perchlorate salt to the reaction vessel is of particular utility where the perchlorate salt has only a limited solubility in the organic solvent involved. For example, sodium perchlorate has only limited solubility in organic solvents such as propanol, so that a rather large volume of solvent would otherwise be required in order to carry out the practice of the present invention of the perchlorate crystals were to be initially placed in the reaction vessel as in the embodiment of the invention illustrated in FIG. 1.

The following examples are illustrative of the practice of the process of the present invention:

Example 1

10 grams of anhydrous lithium chloride and 28.8 grams of anhydrous sodium perchlorate were dissolved separately in dry methanol. The two solutions were then mixed together whereupon sodium chloride precipitated out. The said precipitate was filtered off and the filtrate evaporated to dryness. The anhydrous lithium perchlorate product recovered from the evaporation was dissolved in dry isopropanol and filtered to remove the last traces of sodium chloride. The filtrate was again evaporated to dryness yielding 24.2 grams of anhydrous lithium perchlorate (theor. 25.1 grams). A total of 13.9 grams of sodium chloride (theor. 13.8 grams) was precipitated.

Example 2

The following is a specific example, by way of illustration, of one set of process conditions which can be used for making anhydrous lithium perchlorate with the apparatus shown in FIG. 2, using anhydrous lithium chloride and anhydrous sodium perchlorate as starting materials. One part of anhydrous lithium chloride and 7 to 8 parts, by weight, of a low molecular weight alcohol, substantially free of water, preferably isopropyl alcohol, are introduced into the reaction vessel 2. Anhydrous sodium perchlorate (free of any chlorate) in an amount equimolar with the lithium chloride is placed in the extractor 50. When the lithium chloride is dissolved, which may be aided by heat and agitation, the contents of the reaction vessel 2 are heated to boiling. The alcohol vapors are condensed in condenser 10 and returned through the extractor 50 to dissolve the anhydrous sodium perchlorate therein. When the sodium perchlorate in the extractor 50 is completely dissolved by the condensed alcohol passing therethrough, and the reaction in reaction vessel 2 is completed, the heating and agitation of the contents of the reaction vessel are stopped. The reaction mixture is then allowed to cool to room temperature, after which it is passed through the filter 18 and into the distillation kettle 22. The mixture in the distillation kettle is agitated and heated under vacuum conditions to distill off the alcohol without permitting the temperature to rise above 120 degrees C. When the alcohol ceases to condense, the heat and vacuum are cut and then toluene is added to just cover the crystals and the contents of the distillation kettle are again agitated and heated under vacuo, maintaining the temperature below 120 degrees C. As the toluene distils, it carries with it as an azeotrope any alcohol and/or moisture which may remain in the product. When toluene ceases to distill, the temperature of the contents of the distillation kettle is gradually raised to 180° C. and maintained there, for example, for from 2 to 4 hours while the contents of the kettle are continuously agitated. White crystals of anhydrous lithium perchlorate form and these are removed from the distillation kettle.

It is important that the anhydrous perchlorate used as one of the starting materials in the practice of the present invention be essentially free of chlorates. Thus, for instance, the readily available commercial solutions of sodium perchlorate, from which anhydrous sodium perchlorate is obtained, contain about 0.5 to 0.67%, by weight, of sodium chlorate. Unless this sodium chlorate is removed, for instance, prior to the drying of the sodium perchlorate solution, safety hazards would arise in the practice of the process of the present invention because of the unstable nature of sodium chlorate. It has been found that the following procedure is very satisfactory for reducing the chlorate content. Thus, hydrochloric acid (or other acids or reducing agents), when added to sodium perchlorate solutions containing sodium chlorate, serves to reduce chlorate to chloride and thence to chlorine, without affecting the perchlorate. In a typical practice of using this technique, hydrochloric acid is added to a sodium perchlorate solution in a ratio of about 5 mols per mol of chlorate. The reaction is started by gentle warming after which it becomes somewhat exothermic and proceeds at about 80 degrees C. to completion. The chlorine which is formed in the reaction is boiled off with the water of solution and the sodium perchlorate monohydrate thus recovered can be safely dried at about 150 degrees C. or higher to form the anhydrous sodium perchlorate. Any small amount of sodium chloride in the original solution of sodium perchlorate, or formed in the reaction, will not interfere with the use of said anhydrous sodium perchlorate because of the insolubility of sodium chloride in the organic solvent selected, for instance, n-propanol.

As further examples of the practice of the process of the invention, the following can be used as starting materials in an alcohol solvent, such as isopropyl alcohol, for making anhydrous lithium perchlorate:

(1) Sodium perchlorate and lithium nitrate or lithium nitrite;
(2) Magnesium perchlorate and lithium nitrate; and
(3) Barium perchlorate and lithium chloride, lithium nitrite, lithium nitrate or lithium chromate.

Additional examples of the practice of the process of the invention include, as starting materials, ammonium perchlorate and lithium chloride in ethyl alcohol; barium perchlorate and lithium bromide in acetone; and strontium perchlorate and lithium bromide or lithium nitrate in acetone. However, as previously stated, sodium perchlorate and lithium chloride are the distinctly preferred starting materials and their use represents a particularly important, though limited, embodiment of the invention.

The process of the present invention operates with nearly 100% yield and is substantially less expensive than the dehydration methods of obtaining anhydrous lithium perchlorate heretofore used.

It should be understood that numerous variations may be made in the specific apparatuses disclosed, the ingredients and the proportions thereof and the operating conditions described above without deviating from the broader aspects of the present invention.

What I claim as new and desire to protect by Letters Patent of the United States is:

1. In a process for the production of substantially anhydrous lithium perchlorate, the steps which comprise reacting an anhydrous salt (1) of perchloric acid other than said lithium perchlorate with an anhydrous lithium salt (2) in an anhydrous organic solvent in which lithium perchlorate, said salt (1) of perchloric acid and said anhydrous lithium salt (2) are soluble but in which the salt (3) other than lithium perchlorate resulting from the reaction is insoluble, whereby to produce lithium perchlorate in solution in said organic solvent and to precipitate out said salt (3), and recovering said lithium perchlorate from said solution.

2. In a process for the production of substantially anhydrous lithium perchlorate, the steps which comprise reacting anhydrous sodium perchlorate with an anhydrous lithium salt (a) selected from the group consisting of chloride, bromide, nitrate, nitrite and chromate, in a solution of an anhydrous low molecular weight alcohol in which lithium perchlorate, sodium perchlorate and said lithium salts (a) are soluble but in which the sodium salt resulting from the reaction is insoluble, whereby to produce lithium perchlorate in solution in said alcohol and to precipitate out said sodium salt, and recovering said lithium perchlorate from said solution.

3. In a process for the production of substantially anhydrous lithium perchlorate, the steps which comprise reacting an anhydrous perchlorate (a) selected from the group consisting of sodium, ammonium, magnesium, strontium and barium, with an anhydrous lithium salt (b) in a solution of an anhydrous low molecular weight alcohol in which lithium perchlorate, salt (a) and said lithium salt (b) are soluble but in which the salt (c) other than lithium perchlorate resulting from the reaction is insoluble, whereby to produce lithium perchlorate in solution in said alcohol and to precipitate out said salt (c), and recovering said lithium perchlorate from said solution.

4. In a process for the production of substantially anhydrous lithium perchlorate, the steps which comprise reacting anhydrous sodium perchlorate with anhydrous lithium chloride in an anhydrous propyl alcohol whereby to produce lithium perchlorate in solution in said alcohol and to precipitate out sodium chloride resulting from the reaction, and recovering said lithium perchlorate from said solution.

5. In a process for the production of substantially anhydrous lithium perchlorate, the steps which comprise reacting anhydrous sodium perchlorate with an anhydrous lithium halide in a solution of an anhydrous low molecular weight alcohol in which lithium perchlorate, sodium perchlorate and said lithium halide are soluble but in which the corresponding sodium halide is insoluble, whereby to produce lithium perchlorate in solution in said alcohol and to precipitate out said sodium halide, and recovering said lithium perchlorate from said solution.

6. In a process for the production of substantially anhydrous lithium perchlorate, the steps which comprise reacting an anhydrous salt (1) of perchloric acid other than said lithium perchlorate with an anhydrous lithium salt (2) in an anhydrous organic solvent in which lithium perchlorate, said salt (1) of perchloric acid and said anhydrous lithium salt (2) are soluble but in which the salt (3) other than lithium perchlorate resulting from the reaction is insoluble, whereby to produce lithium perchlorate in solution in said organic solvent and to precipitate out said salt (3), and, during the reaction, refluxing said organic solvent by successively heating the solvent in the reaction zone to evaporate the solvent, recovering the lithium perchlorate, and condensing the evaporated solvent and returning the condensed solvent to the reaction zone.

7. In a process for the production of substantially anhydrous lithium perchlorate, the steps which comprise dissolving in a first vessel an anhydrous lithium salt (1) in an anhydrous organic solvent in which lithium perchlorate and an anhydrous salt (2) of perchloric acid other than said lithium perchlorate are also soluble, but in which the salt (3) comprising the cation portion of said salt (2) of perchloric acid and the anion portion of said lithium salt (1) is insoluble, circulating part of the solvent in said first vessel through a second vessel containing said salt of perchloric acid in its anhydrous form to dissolve the latter salt which is carried in solution to said first vessel, filtering out the insoluble salt (3) resulting from the reaction of said lithium salt (1) and said salt (2) of perchloric acid in said first vessel, and recovering lithium perchlorate from said solvent.

8. In a process for the production of substantially anhydrous lithium perchlorate, the steps which comprise dissolving in a first vessel anhydrous lithium chloride in an anhydrous low molecular weight alcohol in which lithium perchlorate and sodium perchlorate are also soluble but in which sodium chloride is insoluble, circulating part of the alcohol in said first vessel through a second vessel containing anhydrous sodium perchlorate by heating the contents of said first vessel to a temperature in excess of the boiling point of the alcohol, condensing the evaporated alcohol and passing the condensed alcohol into said second vessel to dissolve said sodium perchlorate which is then carried in solution to said first vessel, filtering out the insoluble sodium chloride resulting from the reaction of the lithium chloride and the sodium perchlorate in said first vessel, and recovering lithium perchlorate from the alcohol.

References Cited in the file of this patent

UNITED STATES PATENTS

| | | |
|---|---|---|
| 1,191,916 | Brooks et al. | July 18, 1916 |
| 1,273,208 | Weil | July 23, 1918 |
| 1,303,167 | Collett | May 6, 1919 |
| 1,824,101 | Smith | Sept. 22, 1931 |
| 2,091,898 | Weber | Aug. 31, 1937 |
| 2,373,646 | Binnington | Apr. 17, 1945 |
| 2,374,870 | Litton | May 1, 1945 |
| 2,816,814 | Plucknett | Dec. 17, 1957 |
| 2,929,680 | Stern | Mar. 22, 1960 |

OTHER REFERENCES

Mellor: Comprehensive Treatise on Inorganic and Theoretical Chemistry, vol. 2, pages 395–398 (1922), Longmans, Green & Co., New York.

Fischer Scientific Co., Catalog, "Modern Laboratory Appliances for Chemical Biological, Metallurgical Laboratories," pages 496–497 (1934), Pittsburgh, Pa.

Mellor: Comprehensive Treatise on Inorganic and Theoretical Chemistry, supplement II, part 1, pages 606–609 (1956), Longmans, Green & Co., New York.